INVENTOR
C.M.C. JANSSENS VAN DER MAELEN
By Haseltine Lake + Co.
AGENTS

June 26, 1951 2,558,050
C. MARIE-CORNEILLE JANSSENS VAN DER MAELEN
FLUID TIGHT JOINT
Filed Jan. 29, 1948 2 Sheets-Sheet 2
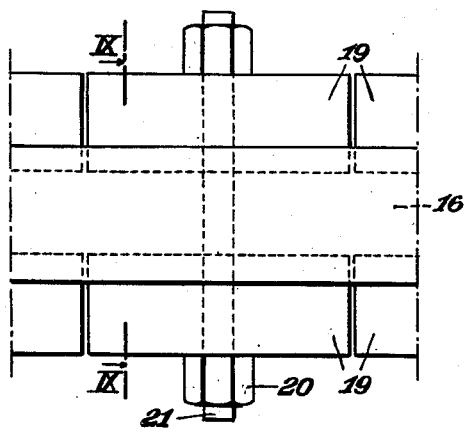
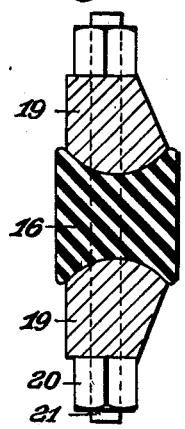
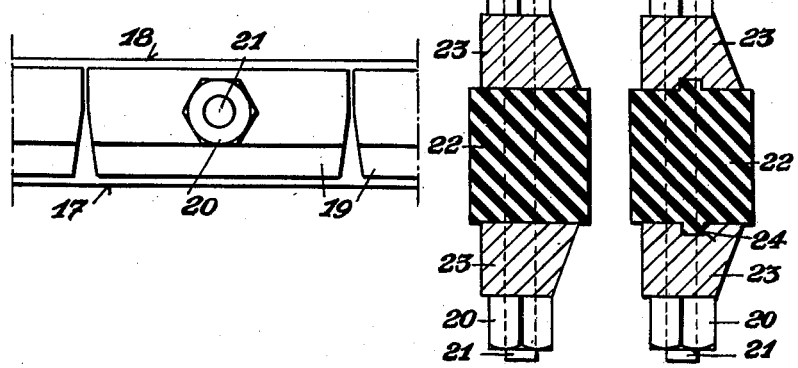
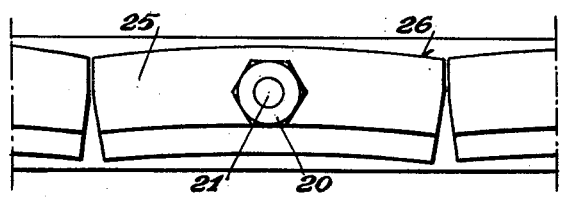
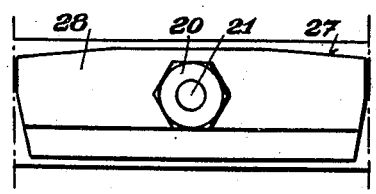
INVENTOR
C.M.C. JANSSENS VAN DER MAELEN
By Haseltine, Lake & Co.
AGENTS Patented June 26, 1951

2,558,050

UNITED STATES PATENT OFFICE 2,558,050

FLUID TIGHT JOINT

Christian Marie-Corneille Janssens van der Maelen, Crainhem, Belgium, assignor to Societe Continentale et Coloniale de Construction, Societe Anonyme, Brussels, Belgium Application January 29, 1948, Serial No. 5,087
In France February 1, 1947

12 Claims. (Cl. 288—2)

Fluid tight joints for pipes and other purposes are known comprising a torus of elastic or plastic material, for example of rubber, and guard plates disposed on both sides of the torus and connected by bolts which pass through the latter and the tightening of which keys the torus between the surfaces to be joined. Such joints must be made specially for each pipe diameter, which requires the manufacture of as many types of joints as there are different diameters of pipes. It will be understood that there also results an increase in the cost of the joints, in particular because it is necessary to make a whole range of metal guard plates of different curvature.

The invention relates to a fluid tight joint system which eliminates these disadvantages by reason of the fact that it is constituted by a strip of indefinite length, made of deformable material (for example of rubber or other elastic or plastic material), and short individual guard plates, the width of which is smaller than the thickness of the said strip and which are disposed on both sides of the latter and joined in pairs by means of bolts passing through apertures provided in the strip and in the plates. In order to form a circular joint of given length it is only necessary to cut out a corresponding length from the said strip by cutting it on the slant through at least one opening, in such a way that the ends of the strip may be assembled by at least one bolt, these ends of the strip being then pressed against one another under the effect of the compression of the strip on tightening the bolts.

The plates according to the invention may be straight or they may have at least one convex longitudinal edge, which may be curved or polygonal. The plates may also be formed with one concave, curved or polygonal, longitudinal edge and one convex, curved or polygonal, longitudinal edge, so as to obtain plates having a relatively small curvature.

The invention also provides for the plates to comprise at least one longitudinal projection facing the packing strip, these plates being for example made in the shape of a gutter embracing a lateral pad provided on the said strip, in such a way as to avoid the angular movement of the plates around the bolts, which permits of providing only a single bolt to each pair of plates. The length of these latter may then be very small, which facilitates the adaptation of a similar joint to a whole range of pipes of different diameters. As the plates are maintained in a suitable position by the said pads, it remains nevertheless possible to make them of maximum length compatible with efficient tightening by a single bolt.

Other features and advantages of the invention will result from the description of a few constructional examples, given hereafter with reference to the accompanying drawings, in which:

Fig. 8 is a plan view of a portion of another joint according to the invention.

Fig. 9 is a view in section taken on line IX—IX, Fig. 8.

Fig. 10 is a side elevation of the joint shown in Fig. 8.

Figs. 11 and 12 are views in section, similar to Fig. 9, of two other modified forms, and, Figs. 13, 14 and 15 are side elevations of still three other modified forms of the joint according to the invention.

Figure 1:
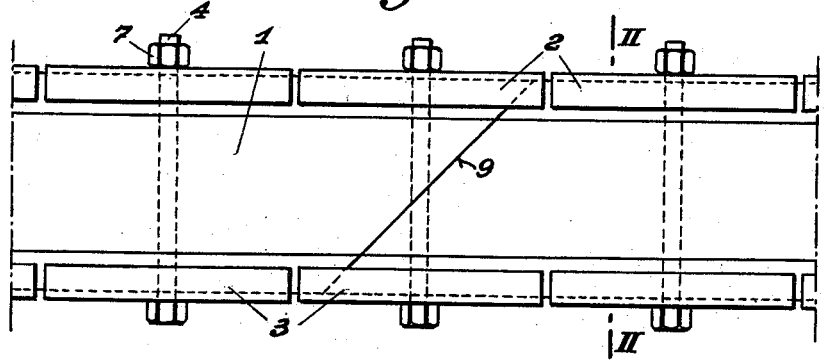
Fig. 1 is a plan view of a section of a joint according to the invention.
Figure 2:
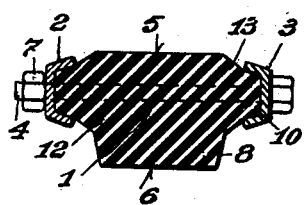
Fig. 2 is a view in section taken on line II—II, Fig. 1.
Figure 3:
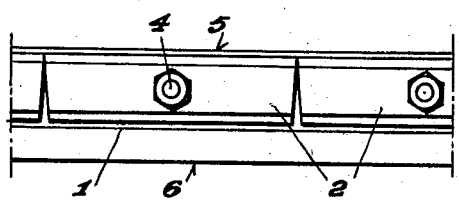
Fig. 3 is a side view of a joint according to the invention.
Figure 4:
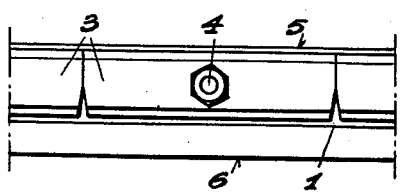
Fig. 4 is a side view of a constructional variant of the joint.

In Figs. 1–7, 1 denotes a strip of rubber or of another elastic or plastic material, 2 and 3 plates disposed on both sides of this strip and connected together by bolts 4 passing through openings provided in the strip 1. The opposite surfaces 5 and 6 of the strip 1 are adapted to be brought into contact with two surfaces between which it is necessary to provide a tight joint, for example the outside surface of the male end of a pipe and the inside surface of the female end of an adjacent pipe or of a connection sleeve for pipes. The locking of the strip between the two surfaces in order to ensure tightness is obtained by tightening the nuts 7. The section of the strip 1 may be modified according to the type of joint. In the example illustrated it is provided with a heel 8 adapted to be engaged in a groove provided in one of the surfaces to be joined.

According to the invention the plates 2, 3 are of short length, for example about 4 to 5 cms., and have a width which is distinctly less than the thickness of the strip in the working position, that is to say to the spacing between the surfaces to be joined. When used as a pipe joint, which will perhaps be the most important application, the joint according to the invention has the advantage of being adaptable to pipes of very different diameters, since the same plates may be used in all cases where the polygon formed by the plates of the joint disposed between the two pipes may be inscribed in, and circumscribed on, circles, the diameters of which are comprised between the internal diameter of the female end and external diameter of the male end of the pipes. It is sufficient to cut a strip of corresponding length, the ends of which are preferably cut with sloping edges centrally through a transverse aperture (9, Fig. 1), the two ends being then joined by a bolt in order to form a circular joint.

If the plates are rectangular and if the joint is placed on a curved surface, without extension of the elastic band, it is necessary to provide a certain play between the successive plates. In order to reduce the gap of naked rubber between the plates, it is preferable to make them of trapezoidal shape over the whole (Fig. 3) or at least a half (Fig. 4) of their width. Moveover, it has been observed that it is of advantage to exert a certain pull on the elastic strip at the time of placing it on a pipe. This permits of mounting the joint completely on the male end and to maintain it positively in place, so that it is only necessary to engage the assembly in the female end and to tighten the nuts in order to complete the joint. The joint placed on the male end constitutes an elastic support for the latter during handling and protects it against shocks.

On stretching the strip when placing it in position, the gaps between the plates are however enlarged. According to the invention this disadvantage is avoided by using plates the length of which exceeds somewhat the space between the apertures formed in the strip, when the latter is in a state of rest. In this state, the plates overlap slightly but they return into alignment after the extension of the strip.

The invention also provides for each plate to be provided with at least one longitudinal projection which engages the strip 1 in such a way as to prevent its rotation in relation to the latter, in spite of the provision of a single bolt to each pair of plates. To this end, the plate may have the shape of a gutter, for example of U-section, with the arms somewhat open, and be engaged on a side pad 10 of the strip. The plate may also be provided with longitudinal ribs 11 (Figs. 5-6), for example, obtained by pressing, which increase at the same time the resistance to flexing under the action of tightening the nuts. By providing a certain play between the wings of the plates and the pad 10 (Fig. 6) every hindrance to the curvature of the strip when it is being placed on a pipe or the like is eliminated.

Although the shape of the transverse section of the strip 1 can vary according to the particular use, it is an advantage to provide fillets 12, 13 between the pads 10 and the body of the strip, in such a way that, when tightening the joint, the surface of each fillet will be progressively applied against the end surface of the adjacent wing of a plate, which ensures a good transmission of the tightening force, without danger of shearing the rubber or the like.

Figure 7:
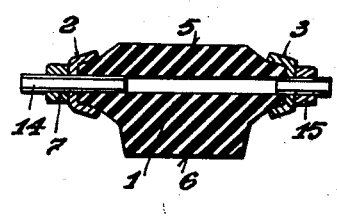
Fig. 7 is a view similar to Fig. 2, illustrating another construction of the locking bolts.
Figure 5:
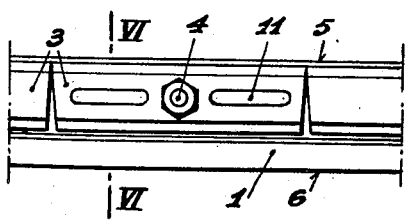
Fig. 5 is a side view of another constructional variant.
Figure 6:
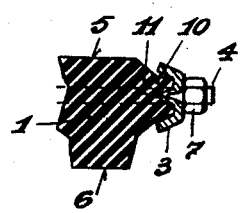
Fig. 6 is a view in section taken on line VI—VI, Fig. 5.

As illustrated in Fig. 7, the bolts 4 can be replaced by a screwed rod 14 on which are engaged the nuts 7, 15. This construction is more economical. In order to avoid any danger of infiltration along the rod, the screw thread is limited to its end zones and the body of the rod is engaged with a tight frictional fit in the corresponding opening of the strip 1.

It will be understood that a joint according to the invention has the advantage that it can be prepared in strips of indefinite length, a desired length of which is cut off in each particular case. Moreover, a similar joint can not only be applied to a whole range of pipes having different diameters, but is suitable also for many other uses. It can in particular serve to fill up cracks in walls, since it can be easily deflected and twisted in order to adapt it to a sinuous line. Instead of being curved around an axis parallel to the bolts 4, it may even be curved around an axis perpendicular thereto, for example in order to serve as a joint between two annular flanges.

It is also desirable to indicate that this joint system permits a fairly substantial angular displacement of one pipe in relation to another, without danger of deterioration of the joint. In effect, the plates being generally made of sheet metal, for example of brass, their wings can approach one another during relative angular movement of the pipe, without danger of breaking either the pipes or the joint. In the case where a leakage is observed at any part of the joint it is, moreover, sufficient to tighten the adjacent nuts in order to increase locally the compression of the joint and regain tightness, this being possible by reason of the separate plates.

Figs. 8-10 show a particularly simple and advantageous executional form of the joint according to the invention. The strip 16 has two opposite plane faces 17, 18 intended to be brought into contact with two surfaces between which it is necessary to provide a tight joint, and two opposite concave faces cooperating with convex faces of the plates 19 which may be urged towards one another by tightening the nuts 20 on the bolts 21 which extend through holes formed in the strip and in the plates. The mutual engagement of the said concave and convex faces prevents the angular displacement of the plates before the final tightening of the joint, so that it is satisfactory to provide a single bolt for each pair of guard plates. Due to the very great area of contact between the strip and the plates, the tightening will be very effective, all the more as the curvature of the pressure exerting faces assists the urging of the material of the strip towards the faces 17, 18. It is obvious that the latter are not necessarily flat faces, but may eventually present a certain curvature.

The holes for the bolts 21 are advantageously arranged excentrically with respect to the faces 17, 18 of the strip, so as to obtain a relatively large free space between the bolts and one of the surfaces against which the faces 17, 18 are applied, for thus facilitating the introduction of a tool for tightening the bolts after the joint has, for instance, been put in place between the male and female ends of two pipes to be assembled.

Fig. 11 shows a simplified construction of the joint, comprising a strip 22 of square or rectangular cross section and plates 23 with a flat active surface. The bolts 20 should then be somewhat tightened before placing the joint in position, so as to avoid angular displacement of the guard plates. A similar effect may be obtained by providing two bolts for each pair of plates, or by the provision of a groove and tongue engagement between the strip and the plates, as shown at 24 (Fig. 12).

When the joint is intended to be placed between curved surfaces, as for the assembly of pipes, use is advantageously made of guard plates having a relatively small longitudinal curvature, as shown in Fig. 13. This curvature will correspond to the average curvature of the range of pipes having different diameters to which a given joint can be applied. The curved plates 25 may be of comparatively greater length than straight plates. Plates of given dimensions may, indeed, be used in all cases where the polygon formed by the plates of the joint disposed between the two pipes may be inscribed in, and circumscribed on, circles, the diameters of which are comprised between the internal diameter of the female end and the external diameter of the male end of the pipes. Since the plates have a curved upper edge 26, they may attain a greater length than straight plates having the same width, for forming a polygon (curvilinear in this case) which can be inscribed in a circle of given diameter. A similar result may be obtained by bevelling the ends of the edge 26 (Fig. 13) so as to form a convex polygonal edge, as shown at 27 for the plates 28 of Fig. 14. The opposite edge may be rectilinear or concave, arcuate or polygonal.

In the case of a joint which is especially intended to be applied between sinuous surfaces alternately curving in opposite directions, both longitudinal edges 29, 30 of the plates 31 may be convex, either arcuate or polygonal, as shown in Fig. 15. The angles of the transverse edges 32, 33 of the plates may be bevelled or rounded. In this case, the bolt 21 will advantageously be located in the middle of the plate.

What I claim is:

1. Fluid tight joint device comprising a strip of deformable material of indefinite length, short and at least substantially straight individual guard plate members having a width smaller than the thickness of the said strip and arranged on both sides thereof, apertures in said strip, at least one aperture in each guard plate member and arranged so as to register with an aperture in said strip, and tightening members arranged in said apertures in said strip and said plates for connecting the latter in pairs.

2. Fluid tight joint according to claim 1, wherein at least one longitudinal edge of the plates is convex.

3. Fluid tight joint according to claim 1, wherein the guard plates are connected in pairs by single bolts.

4. Fluid tight joint according to claim 1, wherein the guard plates are of trapezoidal shape over at least part of their width.

5. Fluid tight joint according to claim 1, wherein the greatest length of the guard plates is at least equal to the space between the orifices provided in the strip.

6. Fluid tight joint according to claim 1, wherein the guard plates are provided with at least one longitudinal projection facing the deformable strip and engaging therewith.

7. Fluid tight joint according to claim 1, wherein the deformable strip has two opposite longitudinal concave faces, while each guard plate has a convex longitudinal face for cooperating with one of said concave faces.

8. Fluid tight joint according to claim 1, wherein the strip is provided with two opposite longitudinal side pads, and the plates being channel-shaped and each enveloping one of said side pads.

9. Fluid tight joint according to claim 8, wherein the plates have a transverse section in the shape of a U with divergent arms.

10. Fluid tight joint according to claim 1, wherein one longitudinal edge of the plates is concave.

11. Fluid tight joint adaptable for inserting between surfaces having different radii of curvature and comprising a strip of deformable material of indefinite length, short and at least substantially straight individual guard plate members having a width smaller than the thickness of the said strip and arranged on both sides thereof, apertures in said strip, at least one aperture in each guard plate member and arranged so as to register with an aperture in said strip, and tightening members arranged in said apertures in said strip and said plates for connecting the latter in pairs, the length of said plates being greater than the difference between the radii and substantially less than the smaller radius.

12. Fluid tight joint according to claim 1, wherein one longitudinal edge of the plates is convex, while the other is concave.

CHRISTIAN MARIE-CORNEILLE
JANSSENS van der MAELEN.

REFERENCES CITED

The following references are of record in the file of this patent:

UNITED STATES PATENTS

| Number | Name | Date |
|---|---|---|
| 569,247 | Smith | Oct. 13, 1896 |
| 1,525,582 | Hosmer | Feb. 10, 1925 |
| 1,777,564 | Hosmer | Oct. 7, 1930 |
| 2,073,890 | Tschappat | Mar. 16, 1937 |
| 2,258,135 | Curtis | Oct. 7, 1941 |